May 9, 1961  W. A. THOMAS  2,983,804
MANUAL MOTOR STARTER
Filed Jan. 2, 1958 2 Sheets-Sheet 1
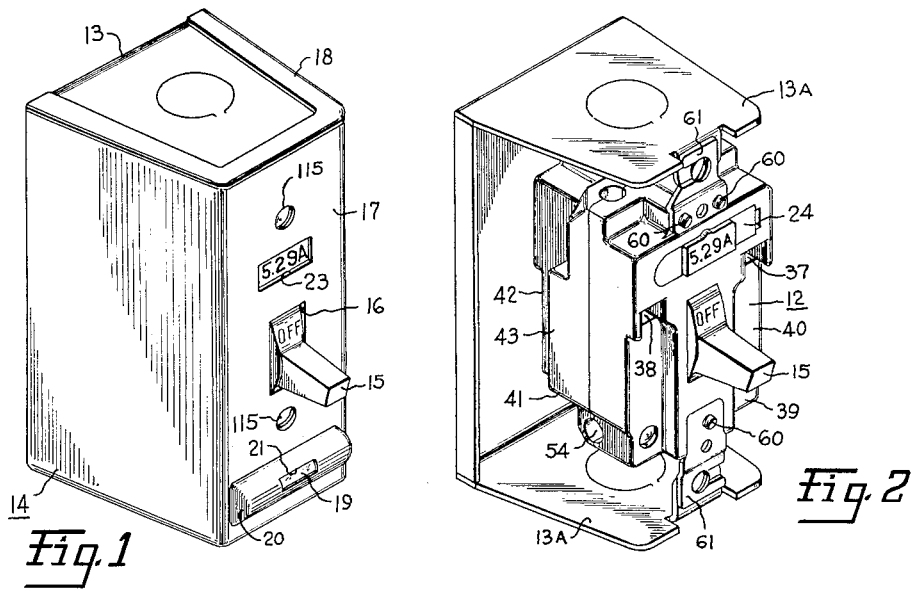
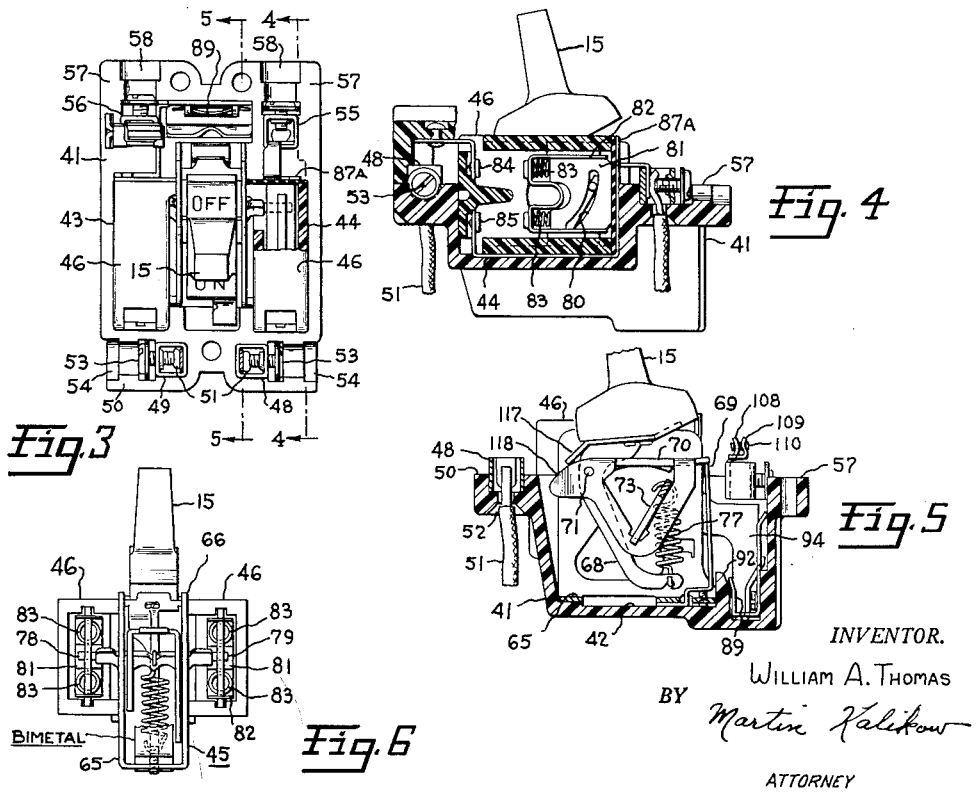
INVENTOR.
WILLIAM A. THOMAS
BY Martin Kalikow
ATTORNEY May 9, 1961  W. A. THOMAS  2,983,804
MANUAL MOTOR STARTER
Filed Jan. 2, 1958  2 Sheets-Sheet 2
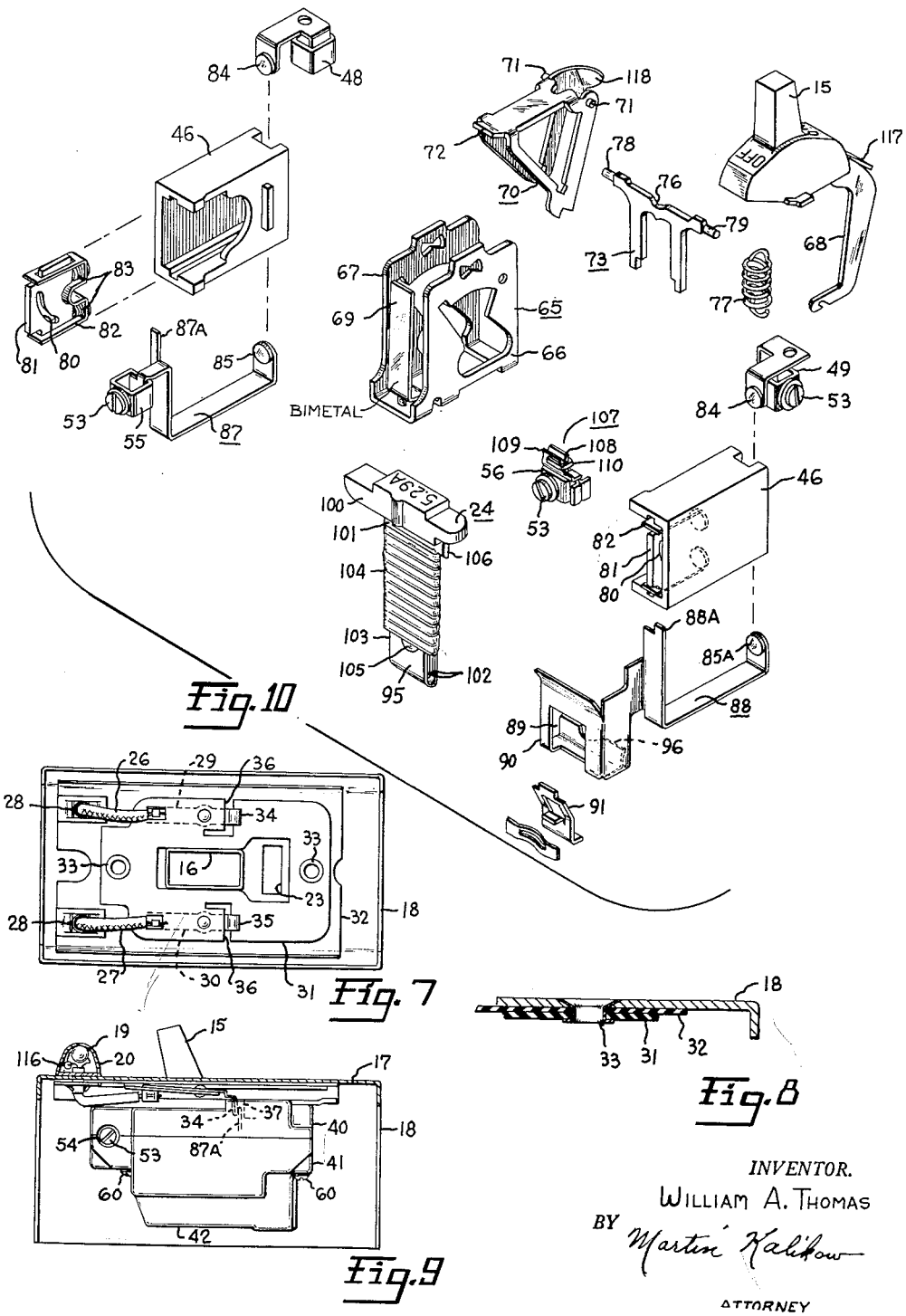
INVENTOR.
WILLIAM A. THOMAS
BY Martin Kalikow
ATTORNEY

United States Patent Office 2,983,804
Patented May 9, 1961

2,983,804

MANUAL MOTOR STARTER

William A. Thomas, South Egremont, Mass., assignor to General Electric Company, a corporation of New York Filed Jan. 2, 1958, Ser. No. 706,679

5 Claims. (Cl. 200—116)

My invention relates to electric switching apparatus and more particularly to manually and automatically operable switching devices for controlling motor, lighting, and other low and moderate power electric circuits.

Small manually and thermally operated switching devices especially those intended to control the operation of small motor circuits are often adapted to be mounted in small metal wall boxes of standard dimensions. It is desirable, therefore, that the dimensions of the switching device especially in the region of the load and line terminals be made as small as possible in order to increase the available wiring space within the wall box above and behind the switching device. It is also desirable that the same switching device be usable with circuits having different electrical loads, such as, for example, provided by motors of different horsepower ratings. In this connection, it is also desirable that the heating element in the device be easily replaceable and that the rating of the heating element be visible from outside of the housing of the switching device. In addition, it is desirable that some remotely visible indication of the electrical condition of the switch be provided on the front panel of the enclosing metal box.

Accordingly, an object of the invention is to provide a manually and thermally operable switching device suitable for controlling the energization of fractional horsepower motors and having unusually small height and depth dimensions for a given horsepower rating.

Another object of the invention is to provide a manually and thermally operable switching device which may be used to control a wide range of electrical loads by means of interchangeable heating elements which may be quickly and easily inserted within or removed from the switching device by a simple plug-in motion. In furtherance of this object, it is a specific object of the invention to make this heater element accessible and replaceable from the front of the switching device without disconnecting any leads or removing the device from its mounting within an enclosing box.

A further object of the invention is to provide means for making automatic connection between terminals on the switching device and an indicating light carried by the enclosing box whenever the front cover of the box is mounted in place; the light giving an indication of the electrical condition of the switching device. A still further object of the invention is to provide easily accessible terminals for testing the line voltage as well as the load current.

In general, in accord with one aspect of the invention, a small, compact, central snap switching mechanism is provided with a thermally responsive element along one side and a switching member swingable across the device immediately beneath the front wall thereof, thereby to minimize the depth and length of the device.

In accord with another aspect of the invention, a heater element for the thermally responsive element is arranged to be plugged into suitable plug-in terminal receiving members on the device through an opening in the front surface thereof. The outer end of the heater element comprises a handle portion that extends beyond the front surface of the device whereby it may be easily grasped manually. The front surface of this handle portion preferably also contains an indication of the heater rating and is adapted to be visible through an aperture in the front cover of an enclosing case. With the heater element removed, the terminal receiving members of the device provide convenient means for testing the load current.

In accord with another aspect of the invention, additional contact making terminals are provided which extend within recesses in the front surface of the switching device, which terminals engage corresponding plug-in terminals carried by the front cover of the enclosing box to supply power to a lamp carried on the front surface of this cover whenever the switching device is in its circuit closing condition. These contact-making terminals also provide convenient means for probe testing of the line voltage.

The novel features believed characteristic of the invention are set forth in the appended claims. The invention itself, together with further objects and advantages thereof will be easily understood by referring to the following description taken in connection with the accompanying drawings in which, Figure 1 is a perspective view of the switching device mounted within an enclosing box, Figure 2 is a perspective view similar to Figure 1 but with the cover of the enclosing box removed to show the switching device itself, Figure 3 is a front view of the switching device of Figure 2 with the front housing section removed and a portion of the arc chute broken away, Figure 4 is a sectional view taken along lines 4—4 of Figure 3, Figure 5 is a sectional view of the switching device taken along lines 5—5 of Figure 3, Figure 6 is a transverse plan view of the switching mechanism of the switching device with the housing removed, Figure 7 is a rear view of the front cover of the enclosing box of Figure 1, Figure 8 is a detail cross-sectional view of a portion of this front cover and, Figure 9 is a side view of the switching device and front cover showing the connections between the device and the indicating light mounted on the cover.

Figure 10 is an exploded perspective view of the operating parts of the switching device of Figure 1.

Referring to Figures 1 and 2, the invention is shown in one form as comprising a switching device 12 mounted on the side flanges 13A of a base 13 of an enclosing box 14 and having a handle 15 extending through an aperture 16 in the front surface 17 of a wrap-around cover 18 of the enclosing box 14. Front surface 17 of cover 18 also carries an indicating lamp 19 within a semi-cylindrical protective metal jacket 20; the lamp 19 being visible through an aperture 21 in this jacket 20. Jacket 20 may alternatively be a transparent plastic member. The front surface 17 of cover 18 preferably also contains a rectangular aperture 23 through which the front surface of a heater element 24 carried by switching device 12 may be visible.

The manner by which indicating lamp 19 receives power from the switching device 12 is shown in Figures 7 and 9. The insulated wire leads 26, 27 of lamp 19 extend through holes 28 in cover 18 and connect to terminal strips 29 and 30 having a central portion located between a pair of insulating sheets 31 and 32 fastened by rivets 33 to the front surface 17 of front cover 18. The terminals 29 and 30 are fastened to the innermost insulating sheet 31 and have U-shaped plug-in type free end connecting portions 34, 35 extending inwardly through slots 36 of sheet 31 to pass into recesses 37, 38 in the switching device 12, as shown in Figure 2.

Referring to Figures 2 through 6, the switching device 12 comprises a housing of molded insulating material split into a top or front portion 40 and a bottom or rear portion 41. Bottom portion 41 is generally cup-shaped with a deep central recessed portion 42 and a pair of shallower recessed opposite side portions 43 and 44. A switch operating mechanism 45, to be described in greater detail hereinafter, is located within the deep central recessed portion 42 while a switching assembly including the arc chutes 46 and contact carrying members are located within the shallower side portions 43 and 44. Line terminals 48 and 49 located on a shelf 50 formed integral with rear housing portion 41 are oriented to receive wires 51 threaded into the terminals through holes 52 in the rear of shelf 50. The terminal lugs are fastened to wires 51 by terminal screws 53 tightened by screw drivers inserted through holes 54 in the sides of the insulated housing. The load terminals 55, 56 are likewise located on shelves 57 formed integral with the housing portion 41 at the opposite end from the line terminals 48, 49. These terminals are likewise oriented to receive wire connections through the rear of the shelves 57 but are tightened down by the insertion of screw drivers into holes 58 in the upper end wall of the housing. Both the line and load terminals, as well as the switching mechanism and arc chutes are trapped in place by the front cover portion 40 of the insulating housing 39. The front and rear portions 40 and 41 of insulating housing 39 are fastened together by bolts 60 inserted through suitable registering apertures at opposite ends and threaded into mounting lugs 61.

In accord with an important aspect of the invention, a small self-contained manually and thermally actuated switch operating mechanism is provided wherein the switching member has its contact actuating end portion swingable across the mechanism immediately beneath the operating handle. This enables the movable contact carrying members which are actuated by this switching member to be located on opposite sides of the switching mechanism close to the front of the housing, thereby permitting the shallow depth dimension of side housing portions 43, 44. Referring particularly to Figures 5, 6, and 10, the switch operating mechanism comprises a U-shaped metal frame 65 having side arms 66, 67 between which the components of the mechanism are mounted. The operating member for the switch is pivoted at the upper end of frame 65 and includes the handle 15 and a metal arm 68 which extends to a point adjacent the bottom of frame 65. A thermally responsive element in the form of an L-shaped bi-metal strip 69 is attached to the base of frame 65 and extends upwardly at one side of the mechanism between the arms 66 and 67. A carrier member 70 having V-shaped side arms is pivoted between arms 66 and 67 by pins 71 at the opposite upper side of the frame. Carrier member 70 contains an overhanging lip or projection 72 at one upper end which rests upon the upper free end of bi-metal strip 69 in latched engagement therewith. A switching member 73 has a pair of downwardly depending arms which are pivoted at their lower end upon the V-shaped notches formed by the V-shaped arms of triangular carrier member 70. The switching member 73 contains an upper switch actuating portion 76 which extends laterally through suitable apertures in the side walls 66 and 67 of frame member 65. This upper switching portion 76 is swingable across the switching device along an arc beneath handle 15 and generally parallel with the front surface of the device. An operating overcenter spring 77 is connected between the operating arm 68 and the center of the switch actuating portion 76 of switching member 73.

The laterally extending ends 78, 79 of switching member 73 enter within arc chutes 46 and pass through slots 80 in movable insulated contact carriers 81, best seen in Figures 4, 6 and 10. A bridging contact member 82 is mounted on contact carrier 81 by springs 83 and is arranged upon lateral movement of contact carrier 81 to engage a pair of stationary contacts, 84, 85. The swinging movement of switching member 73 upon operation of handle 15 causes a lateral reciprocation of contact carrier 81 to make and break the electrical connection between stationary contacts 84 and 85 by virtue of the engagement therewith by contact bridging member 82.

The upper stationary contacts 84 on each side of the switching mechanism are connected to the line terminals 48 and 49 respectively. The lower stationary contact 85 of one pole of the switch is connected by a first strip member 87 passing beneath its adjacent arc chute 46 directly to one load terminal 55 of the switch. The other lower stationary contact 85A in the other pole of the switch is connected by another strip 88 passing beneath the other arc chute 46 to a lower plug-in terminal receiving member or jack 89 for the heater element 24. Connector strips 87 and 88 also contain upwardly extending portions 87A and 88A which terminate within recesses 37, 38 in the front surface of the switching device thereby to engage and supply power to the indicating light through the terminals 34, 35 carried by the under surface of the front cover of the enclosing case.

Lower jack 89 is located on the bottom of recessed central portion 42 in a compartment 94 alongside bi-metal 69. The jack comprises a generally U-shaped metal strip 90 formed integral with conducting strip 88 and a spring biased metal clip 91 extending through an L-shaped aperture in the U-shaped strip 90. The upwardly extending leg portion 96 of U-shaped strip 90 is supported against a ridge 92 in the end wall 93 of the insulating housing. The lower end 95 of plug-in heater 24 is received between one leg 96 of U-shaped metal strip 90 and spring biased metal clip 91.

Plug-in heater 24 has a generally T-shaped configuration with a plastic handle portion 100 adapted to extend beyond the front surface of the insulating housing 40 when the heater 24 is plugged into compartment 94. The heater contains a generally T-shaped metal base strip having its head portion embedded within plastic handle portion 100 and having its elongated stem portion covered on opposite sides by mica insulating sheets 102. Strip 103 is wrapped around the lower end 95 of heater 24 and a coiled heating resistance wire 104 surrounds the mica insulating sheets 102 and has one end connected at 105 to the conducting end strip 103. The other end of heating coil 104 is connected to a shoulder terminal 106 of the metal base strip 101. Shoulder terminal 106 is adapted to be received within an upper plug-in terminal receiving member or jack 107 carried by and connected to load terminal 56, as best seen in Figures 3 and 5. The electrical circuit for heater 24 when plugged into compartment 94 is thus from line terminal 49 through stationary and movable contacts 84, 82 and 85A and thence through conducting strip 88 to lower jack 89, lower heater terminal 103, heating coil 104, upper shoulder terminal 106 of heater 24 and jack 107 to load terminal 56.

Upper jack 107 includes a pair of contact jaws 108 and 109; jaw 108 being formed integral with load terminal 56 and jaw 109 being clamped against jaw 108 by a U-shaped metal spring clip 110. The shoulder terminal 106 of heater 24 is adapted to be received between the contact jaws 108, 109 during plug-in motion of the heater 24. The shape and location of the resistance wire in the heating element as well as the number of turns and type of wire may, of course, be varied to give different desired heating characteristics with different currents passing through the heating device as a result of different loads connected thereto.

In the utilization of switching device 12, a heater element 24 having a heating characteristic designed to match the desired load to be switched is first plugged into compartment 94 within switch 12. The load and line terminals of the two poles of the device are then connected in the circuit to be controlled and the switching device mounted on the end flanges 13A of the wall box 14. The wrap-around cover 18 of the wall box is then mounted in place by screws 115 thereby bringing indicating lamp terminals 34 and 35 into engagement with the upper ends 87A, 88A of the conducting strips 87, 88 within recesses 37 and 38 of the switching device 12. Operation of handle 15 causes the lower end of operating arm 68 to carry the over-center spring 77 across the pivot of switching arm 73 in the V notches of carrier 70 thereby to swing the upper portion of switching arm 73 with a snap action. The movement of switching arm 73 impels a corresponding snap opening and closing movement of the stationary and movable contacts 82, 84 and 85 within the arc chutes 46. The closure of these contacts delivers current between the line and load contacts of each pole of the switch and through the heater 24 in series with one pole of the switch. Current is also delivered to the upper ends 87A, 88A of the connecting strips 87, 88 thereby to supply power to the indicating lamp whenever the switch is closed, whose magnitude depends upon the voltage difference between the two poles of the line. Indicating lamp 19 may conveniently have a current limiting resistor 116 connected in parallel or in series therewith to protect the lamp against burn out due to excessive voltages or currents.

In the event of an overload or short circuit in the circuit controlled by switching device 12, the greater current flowing through heater element 24 will cause the bi-metal 69 to deflect toward the heater and unlatch the carrier member 70 from the upper end of the bi-metal. The carrier member will then swing downward about its pivot 71 as the result of the force of over-center spring 77 upon the carrier through the switching arm 73 and this downward pivotal motion of carrier 71 will carry the switch actuating end of the switching arm 73 downward and across the face of the switching device 12 thereby to open the switching contacts 82, 84 and 85. This tripping motion of the carrier 70 also carries the operating arm 68 to an intermediate position between its off and on position thereby to move the handle 15 to an intermediate trip indicating position. Upon clearing of the fault in the line and cooling of bi-metal 69, the switching device may be reset by moving the handle back to the off position; an extension arm 117 of operating member 68 serving to engage a projection 118 upon carrier member 70 to enforce this resetting movement of the carrier member 70.

If it should thereafter be desired to use the switching device 12 with a load of different rating, the cover 18 of the closing box is removed, and the heater element 24 is merely pulled out and replaced by a heater of different rating without the necessity for disconnecting the switching device or removing any portion of its housing.

It will be appreciated that the unusually small dimensions of the switching device 12 are achieved because of the small and compact arrangement of the switching mechanism as well as the orientation of the switching contacts relative to the operating mechanism. The compactness of the operating mechanism is achieved in part by the location of the pivot for the operating member above the pivot for the switching member together with an extension of the operating member to a point below the pivot of the switching member and the use of a single over-center spring between this extension arm and the upper swingable end of the switching member. The orientation of the switching contacts adjacent the front of the device also facilitates the replacement of the switching contacts, if necessary, by merely removing the front housing portion 40 to expose the contact assemblies. In addition the location of the operating member relative to the location of the pivot axes of the carrier and switching members is such that the contact closing position of the swingable end portion of switching member falls adjacent a line connecting these pivot axes and causes the operating spring to exert a contact pressure between the switching contacts substantially greater than the latching pressure between the carrier member and bi-metal strip.

Although I have described a specific embodiment of my invention, many modifications may be made, and I intend, therefore, to cover by the appended claims all such modifications as fall within the true spirit and scope of the invention.

What I claim as new and desire to secure by Letters Patent of the United States is:

1. An electric switching device comprising an upwardly extending supporting surface, a bi-metal strip supported on said surface and having its deflecting portion above its point of support, a carrier pivotally mounted on said surface in latching relationship with said deflecting portion of said strip, a switching member pivoted on said carrier and having an upwardly extending contact actuating swingable end portion, an operating member pivotally supported on said surface above the pivot of said switching member, said operating member having an upper handle portion extending through the top of said apparatus and a lower portion extending below the pivot of said switching member, and an over-center operating spring connected between said lower portion of said operating member and said swingable portion of said switching member.

2. An electric switching device comprising a pair of spaced supporting upwardly extending walls, at least one wall having an aperture therein across its upper portion, a bimetal strip extending between said walls, and having a deflecting portion, a carrier pivotally mounted on and extending between said walls in latching relationship with said deflecting portion of said bi-metal strip, a switching member pivoted on said carrier and having a swingable contact actuating portion above its pivot extending through said aperture in said wall, an operating member pivotally supported between said walls above the pivot of said switching member, said operating member having a handle extending through the top of said device and a lower portion extending below the pivot of said switching member, and an over-center operating spring connected between said lower-portion of said operating member and said swingable portion of said switching member.

3. An electric switching device comprising a U-shaped metal frame having an aperture across the upper portion of at least one side wall thereof, a bi-metal strip mounted on said frame and extending upwardly between the walls thereof, a carrier pivotally mounted on and extending between said walls in latching relationship with the upper portion of said bi-metal strip, a switching member pivoted on said carrier and having a swingable portion above its pivot, said swingable portion having a switch actuating end extending laterally through said aperture, an operating member pivotally supported between said walls above said switching member, said operating member having a handle extending through the top of said device and a lower portion extending below the pivot of said switching member, and an over-center operating spring connected between said lower portion of said operating member and said swingable portion of said switching member.

4. An electric switching device comprising an upwardly extending supporting surface, a bi-metal strip supported on said surface and having a deflecting portion above its point of support, a carrier in latching relationship with said deflecting portion and pivotally mounted on said support on a pivot axis spaced laterally from said deflecting portion, a pair of switching contacts adjacent an upper part of said supporting surface, a switching member for operating said contacts pivoted on said carrier on a pivot axis below and between said carrier pivot axis and said deflecting portion, said switching member having an upwardly extending swingable portion cooperating with said switch contacts movable to a contact closing position adjacent a line connected between the pivot axes of said carrier and switching member, an operating member pivoted on said surface above said carrier pivot axis and having a lower portion extending below the pivot axis of said switching member, and an over-center spring connected between said lower portion of said operating member and said swingable end portion whereby said spring exerts a contact pressure between said closed contacts substantially greater than the latching pressure between said carrier and bi-metal.

5. An electric switching device comprising a housing having an internally recessed central portion and a pair of opposite internally recessed side portions, a bi-metal strip supported in said central portion and having its deflecting portion above its center of support, a carrier pivotally mounted in said central portion in latching relationship with said deflecting portion of said strip, a switching member pivoted on said carrier and having an upwardly extending swingable end portion, an operating member pivotally supported in said central portion above the pivot of said switching member, said operating member having an upper handle portion extending through the top of said housing and a lower portion extending below the pivot of said switching member, an overcenter operating spring connected between said lower portion of said operating member and said swingable portion of said switching member, said switching member extending outwardly from said central portion into said side portions, and switching assemblies located within the recesses of said side portions and actuated by said switching member.

References Cited in the file of this patent

UNITED STATES PATENTS

| | | |
|---|---|---|
| Re. 21,429 | Petersen | Apr. 16, 1940 |
| 1,432,898 | Price | Oct. 24, 1922 |
| 1,664,380 | Meyers | Mar. 27, 1928 |
| 1,786,727 | Adam | Dec. 30, 1930 |
| 2,026,412 | Abbott | Dec. 31, 1935 |
| 2,119,680 | Long | June 7, 1938 |
| 2,192,586 | Getchell | Mar. 5, 1940 |
| 2,214,695 | Jennings | Sept. 10, 1940 |
| 2,283,736 | Jackson | May 19, 1942 |
| 2,433,720 | Van Valkenburg | Dec. 30, 1947 |
| 2,443,090 | Wise | June 8, 1948 |
| 2,611,055 | Webster | Sept. 16, 1952 |
| 2,659,792 | Boardman | Nov. 17, 1953 |
| 2,681,966 | Christensen | June 22, 1954 |
| 2,809,255 | Dyer et al. | Oct. 8, 1957 |
| 2,813,951 | Kolb et al. | Nov. 19, 1957 |
| 2,831,935 | Page | Apr. 22, 1958 |